United States Patent [19]
Kozina et al.

[11] Patent Number: 5,953,073
[45] Date of Patent: Sep. 14, 1999

[54] METHOD FOR RELATING INDEXING INFORMATION ASSOCIATED WITH AT LEAST TWO INDEXING SCHEMES TO FACILITATE THE PLAY-BACK OF USER-SPECIFIED DIGITAL VIDEO DATA AND A VIDEO CLIENT INCORPORATING THE SAME

[75] Inventors: Gerald E. Kozina, Cupertino; Jian Xu, San Jose, both of Calif.

[73] Assignee: International Business Machines Corp., Armonk, N.Y.

[21] Appl. No.: 08/688,114

[22] Filed: Jul. 29, 1996

[51] Int. Cl.$^6$ ........................................................ H04N 5/46
[52] U.S. Cl. ................................ 348/558; 386/1; 455/5.1
[58] Field of Search ................................ 348/7, 510, 512, 348/513, 516, 384, 558; 709/217; 386/4, 102, 109, 110, 111, 112, 1, 45, 68–70, 81–82, 131, 125–126; 455/5.1, 4.2

[56] References Cited

U.S. PATENT DOCUMENTS

| | | | |
|---|---|---|---|
| 5,428,393 | 6/1995 | Enokida | 348/390 |
| 5,649,185 | 7/1997 | Antognini et al. | 395/609 |

FOREIGN PATENT DOCUMENTS

| | | | |
|---|---|---|---|
| 0 176 324 A1 | 2/1986 | European Pat. Off. | H04N 5/76 |

*Primary Examiner*—Andrew I. Faile
*Assistant Examiner*—Alexander Berhe
*Attorney, Agent, or Firm*—Sughrue, Mion, Zinn, Macpeak & Seas, PLLC

[57] ABSTRACT

The present invention is directed to a method for relating indexing information associated with at least two indexing schemes to facilitate the play-back of user-specified digital video data. The method includes the steps of scanning a stream of digital video data for indexing information related to at least two indexing schemes prior to being stored in a video server, and generating a mapping table in order to convert indexing information associated with one of the at least two indexing schemes to corresponding indexing information associated with another one of the at least two indexing schemes. The indexing information identifies discrete portions of said stream of digital video data so that those portions can be accessed at a later time. The mapping table may be stored in a database. A video client is also provided according to the present invention which relates indexing information associated with at least two indexing schemes to facilitate the play-back of user-specified digital video data on a video display. The video client includes a loader and a video player. The loader scans the digital video data for indexing information and loads the digital video data into a video server. The loader includes a mapper which generates a mapping table relating indexing information associated with at least two indexing schemes. The video player controls the play-back of the digital video data using the mapping table which is retrieved by the video player when digital video data is to be displayed. The video server sends the digital video data in response to the control exercised by the player to the video display for display thereon.

44 Claims, 4 Drawing Sheets

METHOD FOR RELATING INDEXING INFORMATION ASSOCIATED WITH AT LEAST TWO INDEXING SCHEMES TO FACILITATE THE PLAY-BACK OF USER-SPECIFIED DIGITAL VIDEO DATA AND A VIDEO CLIENT INCORPORATING THE SAME

FIELD OF THE INVENTION

The present invention is directed towards a video client which facilitates the input and display of digital video data. More particularly, the present invention is directed towards a method for relating indexing information associated with at least two indexing schemes to facilitate the play-back of user-specified digital video data and a video client incorporating the same.

DESCRIPTION OF RELATED ART

Video clients incorporate a graphical user interface through which the user controls the play-back of a stream of digital video data. Video clients may consist of a loader which is used to channel information from the video client to video hardware which is capable of storing the digital video data. The loader may be used to import digital video data into a video system in which the video client is integrated, the video system including the video hardware in which the digital video is to be stored. Alternatively, the loader utility may be used to export digital video data to video hardware residing outside of the video system. The video client may also include a video player which is generally analogous to a conventional video cassette recorder (VCR) to the extent that the former includes functions such as play, stop, pause, and rewind. With the proliferation of multimedia based applications in the computer industry, a number of video players have been developed for different platforms. These video players support either individual or multiple video data formats. Video players may be entirely software based, or they may rely in part on accelerator cards or some other hardware-based support to perform decoding.

Currently there are no video players which implement the Society of Moving Picture and Television Engineers ("SMPTE") time code-based display and control indexing scheme. SMPTE time codes are easily understood by any one who is familiar with how to read a conventional digital clock.

Even if a SMPTE time code based video player were available, many video servers which supply digital video data for play-back on a video display in response to requests by a video player rely on an incompatible indexing scheme that would require some form of translation between SMPTE time codes and indexing information associated with the alternate indexing scheme which is compatible with the video server.

The Media Streamer developed by IBM, for instance, relies on a Moving Pictures Experts Group ("MPEG") byte-offset based-indexing scheme but does not understand SMPTE time codes. Accordingly, even if a SMPTE time code based video client were desired, some means for translating the indexing information associated with the incompatible indexing scheme would still be required.

SUMMARY OF THE INVENTION

In view of the foregoing, it is an object of the present invention to provide a method for relating indexing information associated with at least two indexing schemes to facilitate the play-back of user-specified digital video data.

According to the present invention, the method comprises the steps of scanning a stream of digital video data for indexing information related to at least two indexing schemes prior to being stored in a video server, and generating a mapping table in order to convert indexing information associated with one of the indexing schemes to corresponding indexing information associated with another one of the at least two indexing schemes. The indexing information identifies discrete portions of said stream of digital video data so that those portions can be accessed at a later time.

According to one aspect of the present invention, the method may further include the step of storing the mapping table. Preferably, the mapping table is stored in a database.

According to another aspect of the present invention, the method may further include the steps of selecting a segment of the stream of digital video data to be played on a video display, retrieving the mapping table, monitoring control means included within a graphical user interface of a video client to determine whether indexing information associated with an original indexing scheme of the at least two indexing schemes has been entered using the control means, and converting any indexing information entered using the control means to indexing information associated with another indexing scheme of the at least two indexing schemes which is compatible with a video server which sends the digital video data to the video display.

In addition, the method may also include the steps of transferring the converted indexing information to said video server, and displaying a portion of the segment of the stream of digital video data corresponding to the converted indexing information, the video server sending the portion to the video display for display thereon.

According to yet another aspect of the present invention, the indexing information entered using the control means includes SMPTE time codes.

According to yet another aspect of the present invention, the converted indexing information includes MPEG byte-offsets.

In addition to the method described above, the present invention is also directed to a video client which relates indexing information associated with at least two indexing schemes to facilitate the play-back of user-specified digital video data on a video display.

The video client includes a loader which scans the digital video data for indexing information and loads the digital video data into a video server. The loader includes a mapper which generates a mapping table relating indexing information associated with the at least two indexing schemes. The video client also includes a video player that controls the play-back of the digital video data on a video display using the mapping table which is retrieved by the video player when the digital video data is to be displayed. The video server sending the digital video data to the video display in response to the control exercised by the video player.

BRIEF DESCRIPTION OF THE DRAWINGS

These and other features, aspects and advantages of the present invention will become better understood with reference to the following description, appended claims, and accompanying drawings, in which:

DETAILED DESCRIPTION OF THE PREFERRED EMBODIMENTS

The present invention is directed to a method for relating indexing information associated with at least two indexing schemes to facilitate the playback of user-specified digital video data and a video client incorporating the same.

Figure 1:
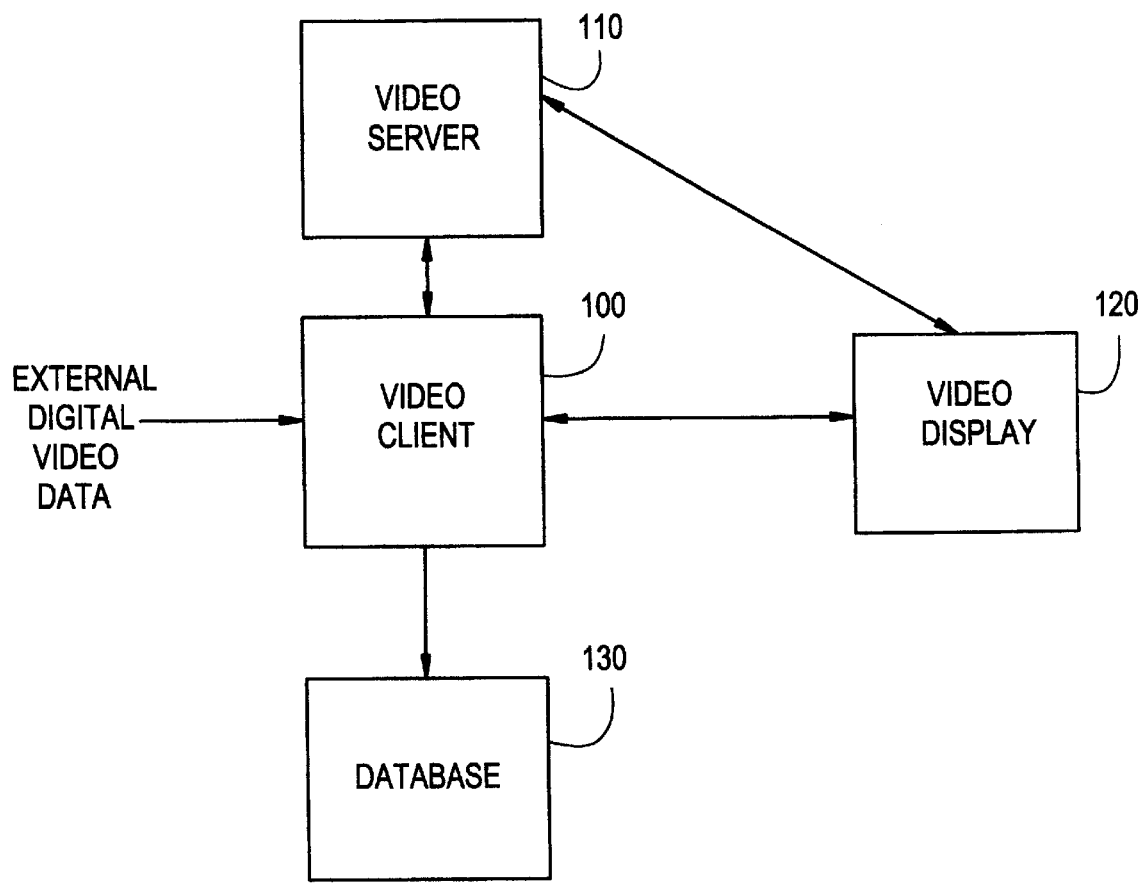
FIG. 1 shows an overview of a system incorporating a video client of the present invention.

FIG. 1 depicts a system incorporating a video client 100 of the present invention. The system also includes a video server 110 which receives a stream of digital video data from the video client 100 and delivers a segment of the stream of digital video data to the video player 100 for play-back on a video display 120 associated with the video client 100.

Included within the digital video data is indexing information used to identify a particular portion of the segment of digital video data to facilitate later access and play-back of that portion. By way of example, the indexing information may include SMPTE time codes or MPEG byte-offsets.

The system also includes a database 130 for storing a mapping table relating indexing information associated with an indexing scheme which is user-friendly to indexing information associated with an indexing scheme which is compatible with the video server 110. Preferably, the Digital Library, developed and marketed by IBM Corporation, is employed as the database. The Digital Library can store both digital video objects and information related to the same.

SMPTE time codes are a form of indexing information associated with a user-friendly indexing scheme. SMPTE time codes relate specific frames of video to a specific time (e.g. hour, minute, and second). In order to access a specific portion of the digital video data indexed using SMPTE time codes, a user merely has to specify a particular time and frame associated with that portion.

In contrast, indexing information in the form of MPEG byte-offsets are not associated with a user-friendly indexing scheme because an MPEG byte offset reflects the physical address of a frame of digital video data in memory or disk storage. It is much harder for a user to relate to an indexing scheme which includes MPEG byte-offsets because they are not intuitively understood by the vast majority of users. However, MPEG byte-offsets may be the only form of indexing information that a particular video server understands. This is the case with the Media Streamer developed by IBM.

The Media Streamer is described in detail in U.S. patent application Ser. No. 302,616, entitled "Video Optimized Media Streamer for Generating Isochronous Data Streams", which was filed on Sep. 8, 1994 and is incorporated herein by reference.

The Media Streamer understands MPEG byte-offsets but not SMPTE time codes. Hence, the above-described mapping table is provided in order to facilitate the conversion of SMPTE time codes into MPEG byte-offsets for use by the Media Streamer.

Figure 2:
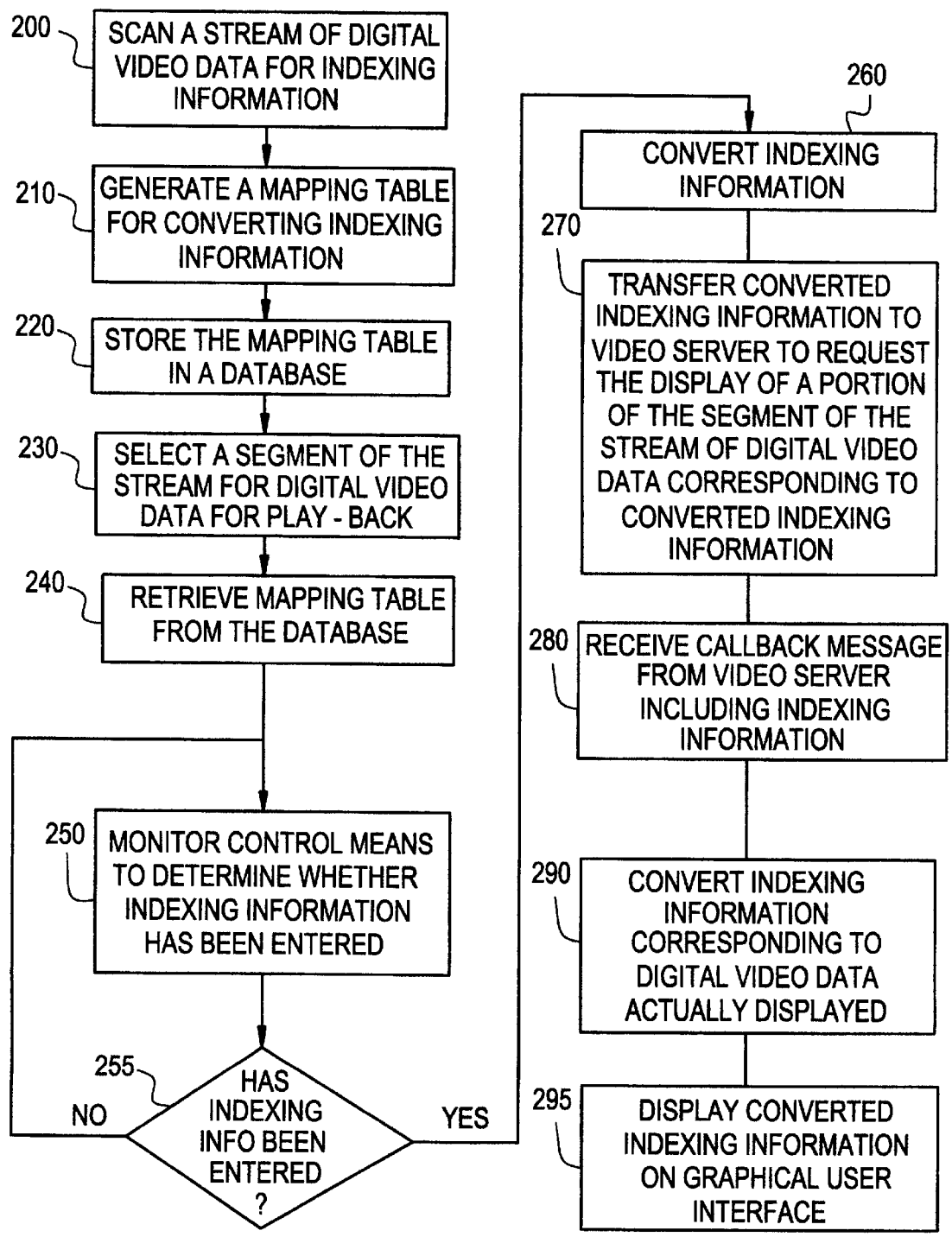
FIG. 2 shows a flow chart incorporating a method of the present invention.

The system described in connection with FIG. 1 operates in conformity with the method of the present invention whose steps are incorporated into the flow chart shown in FIG. 2. In step 200, the video client (element 100 of FIG. 1) scans a stream of digital video data for indexing information related to at least two indexing schemes prior to being stored in the video server (element 110 of FIG. 1). As described above, this indexing information may include SMPTE time codes and MPEG byte offsets. In step 210, a mapping table is generated by the video client in order to convert indexing information associated with one of the indexing schemes to corresponding information associated with another one of the indexing schemes. In step 220, the mapping table is stored in a database (element 130 of FIG. 1).

In step 230, a segment of the stream of digital video data is selected to be played on a video display associated with the video player. In step 240, the mapping table is retrieved from the database after the segment has been selected by a user of the video client. In step 250, the video client monitors control means on the graphical user interface thereof in order to determine whether indexing information has been entered using the control means, the indexing information being associated with an original indexing scheme. Preferably, the indexing information entered using the control means includes SMPTE time codes.

If it is determined in step 255 that indexing information is not entered using the control means, then the video client continues to monitor the control means to see if indexing information has been entered. However, if it is determined in step 255 that indexing information has been entered then step 260 is performed, in which the indexing information is converted to indexing information which is associated with an indexing scheme which is compatible with the video server.

The converted indexing information may include MPEG byte-offsets. In step 270, the converted indexing information is transferred to the video server. Upon receiving the converted indexing information, the video server sends a portion of the segment of the stream of digital video data corresponding to the converted indexing information to the video display for display thereon.

In step 280, the video server sends a call back message to the video client including indexing information associated with the indexing scheme which is compatible with the video server, the indexing information corresponding to a portion of the segment of the stream of digital video data which was actually displayed on the video display.

In step 290, the video client converts the indexing information included in the call back message into indexing information associated with the original indexing scheme. Subsequently, in step 295, the video client displays on the graphical user interface the indexing information associated with the original indexing scheme which corresponds to the portion of the segment of the stream of digital video data which was actually displayed on the video display.

Figure 3:
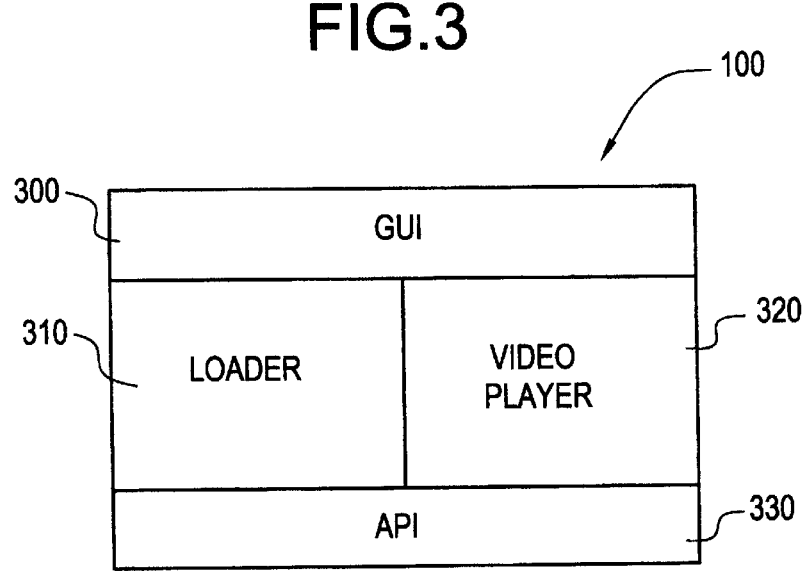
FIG. 3 shows the constituent elements of a video client of the present invention.

FIG. 3 depicts the constituent components of the video client. The video client 100 may be implemented entirely in software, or may incorporate specific hardware elements which are designed to provide an interface between the video player 100 and the video server (element 110 of FIG. 1). By way of example, the video player 100 may incorporate a decoder card (not shown) which interfaces with the video server. The decoder card is used to convert the digital video data into a format which can be displayed on a conventional television or a window disposed on the screen of a conventional computer terminal which supports video. The video client should be implemented on a computer incorporating a video display so that the graphical user interface can be displayed thereon.

A video client 100 according to the present invention includes three distinct layers. The only layer with which the user interacts includes the graphical user interface 300 which constitutes one component of the video client. It is through the graphical user interface of the video client that the user enters commands specifying the particular segment of digital video data which is to be played and indexing information which relates to a specific portion of the segment from which play-back is to commence.

The user also enters commands via the graphical user interface related to external streams of digital video data which are to be stored in the video server and the database if the later is capable of storing digital video data. However, the first layer may also incorporate a command line interpreter in order to allow users to key in commands directly.

Supporting the graphical user interface are two other components of the video client 100 which constitute a second layer of the same. One component of the second layer is the loader 310. The loader 310 is responsible for loading, unloading, exporting, and deleting digital video data within the system described above in connection with FIG. 1.

Specifically, the user can load external digital video data from outside the system and store the digital video data in the video server and the database if the later is capable of supporting digital video data. The user can also unload, export or delete digital video data residing in the system using the loader 310. Unloading is to be distinguished from exporting to the extent that unloading outputs the digital video data to an output file and removes the same from the system.

In order to load, unload, export, or delete digital video data, the user enters commands through either the graphical user interface or the command line interpreter which may both support the loader 310. These commands are selected from a library of loader functions corresponding to the functions described above.

When the user first imports a stream of digital video data into the system through the video client 100, the loader 310 calls an MPEG Mapper which is a loading tool implemented in software. The MPEG Mapper scans the imported stream of digital video data in order to locate SMPTE time codes which the MPEG compression format supports.

At the same time, the MPEG Mapper counts the byte offsets and produces a one-to-one mapping between the SMPTE time code associated with each frame of digital video data and a corresponding MPEG byte-offset. The mapping table is then written by the MPEG Mapper into a temporary file. Although SMPTE time codes and MPEG byte offsets have been specified a mapping table can be created which relates indexing information associated with alternative indexing schemes.

Once the temporary file associated with the mapping table is created, the loader 310 creates a video item associated with a specific segment of the stream of digital video data. The video item includes several distinct parts and a list of attributes assigned by the user via the loader. One part corresponds to the physical digital video data or object. Another part corresponds to a descriptive object which contains additional information for search and play, including the mapping table. The remaining part corresponds to annotation notes entered by the user when the logging process is initiated during play-back.

The above-mentioned attributes include a unique name for the video segment, a descriptive name for the video segment, the specific video server in which the segment is located (if there are more than one in the system), the data rate at which the video was encoded, the number of streams (or versions) of the video segment which may be played concurrently, the duration of the video segment, and the total number of bytes associated with the video segment when stored in memory.

Once the video item is created it is stored in the database or the video server and the temporary file representing the mapping table is deleted.

Another component of the second layer of the video client 100 is a video player 320 which implements a number of functions related to the play-back of a user-specified segment of digital video data including the retrieval of the mapping table created by the loader 310. These functions are initiated by user-specified commands including play, stop, pause, fast forward, slow forward, rewind to beginning, and jump. In addition, the video player facilitates the conversion of SMPTE time codes, which are entered by the user, to MPEG byte-offsets and visaversa. An MPEG byte-offset is required by the video server (element 110 of FIG. 1) in order for it to retrieve a portion of the segment of digital video data for play-back on a video display (element 120 of FIG. 1).

The third layer of the video client includes the application program interface ("API") which allows the video client to communicate with a video server, such as the Media Streamer described above. The API component of the video client allows for the conversion of local function calls to remote procedure calls ("RPCs") which are supported by the video server. An RPC may include a position parameter which corresponds to an MPEG byte-offset associated with a particular frame of a segment of digital video data corresponding to a portion of the segment which the user wishes to view. By way of example, the frame may be an I-frame associated with the MPEG compression format.

There may be more than one graphical user interface associated with the video client 100. By way of example, the loader 310 and video player 320 components of the second layer may each have an associated graphical user interface through which their corresponding functions are entered. Exemplary aspects of the graphical user interface associated with the loader are shown in FIGS. 4(*a*) and 4(*b*).

Figure 4A:
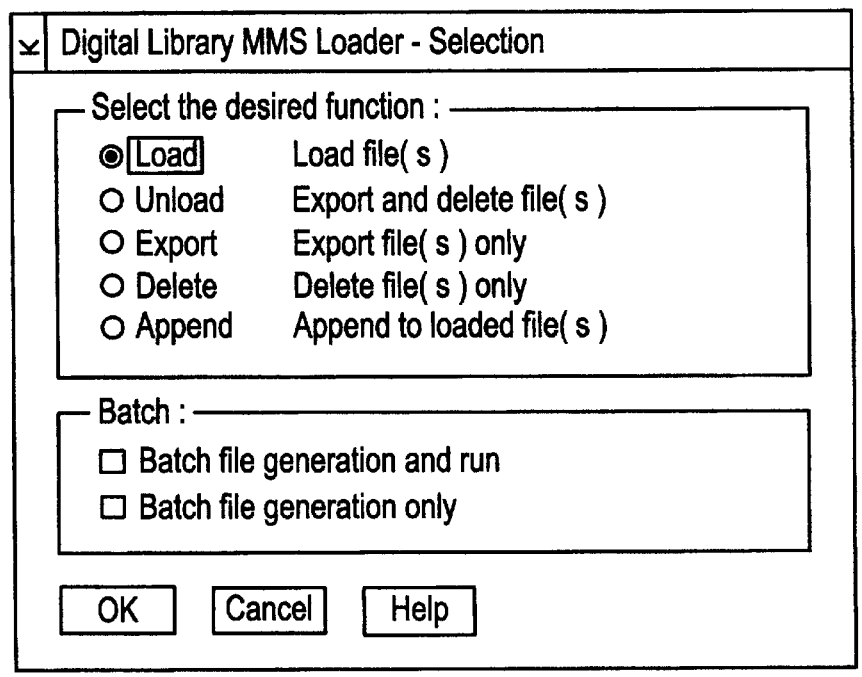
FIGS. 4(a) and 4(b) show two aspects of a graphical user interface associated with a loader component included in a video client of the present invention.
Figure 4B:
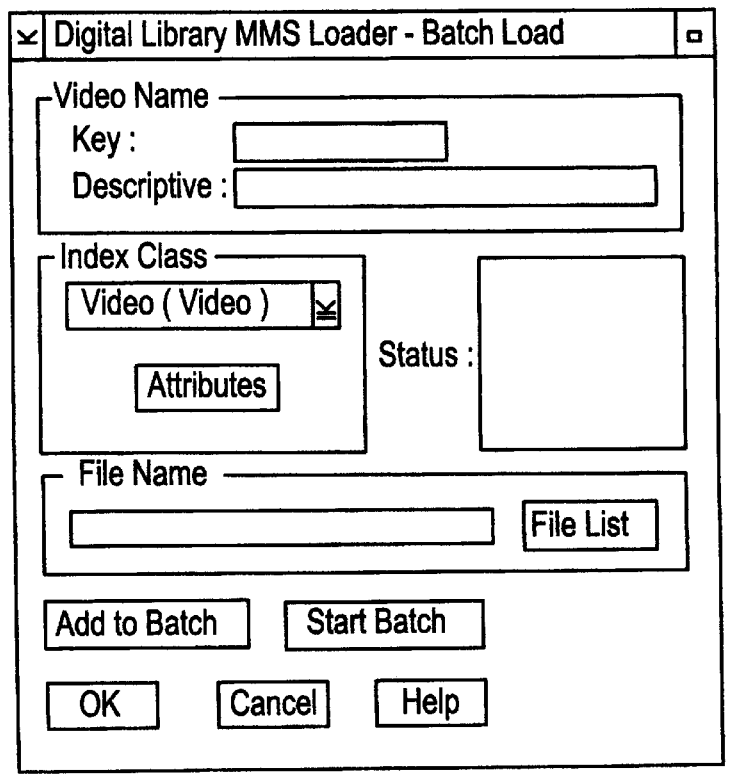

FIG. 4(*a*) depicts one aspect of the graphical user interface which includes control buttons associated with the above-described functions of the loader. Descriptive text corresponding to each function is shown to the right of each control button. In FIG. 4(*a*), the user has selected the load function which stores an external digital video data file in the video server (element 110 of FIG. 1) or the database (element 130 of FIG. 1) if the later supports digital video data. The control buttons which are associated with the batch related functions allow a user to enter a series of commands to be executed sequentially. A file then can be created in order to store these commands.

Once the user has selected the load function, another aspect of the loader's graphical user interface is displayed on the video display, as shown in FIG. 4(*b*). This aspect of the graphical user interface allows the user to specify a specific segment of digital video data to be loaded. The user then enters the video name which has two distinct portions. One portion is a key entry by which the video segment, as a whole, is uniquely identified. The other is a descriptive name which is easily understood by the user. The index class shown in FIG. 4(*b*) corresponds to a class of associated segments of digital video data, as specified by the user. By way of example, FIG. 4(*b*) shows the default classification which is "Video".

If the batch commands are to be loaded in a specific file, the file name is entered, or a particular file is selected from a list. The loader command including the video name of the specific segment of video are then added to the batch command file when a user actuates the ADD TO BATCH control button after the START BATCH control button has been selected.

Once the user is satisfied with the information which has been entered, the OK control button is actuated by the user. Alternatively, the user may cancel the entries by actuating the CANCEL control button, or select a help feature of the loader by actuating the HELP control button.

The control buttons are actuated either through a mouse or keyboard associated with the computer upon which the video client is provided, whereas text-based information may be entered via the keyboard if needed.

Figure 5:
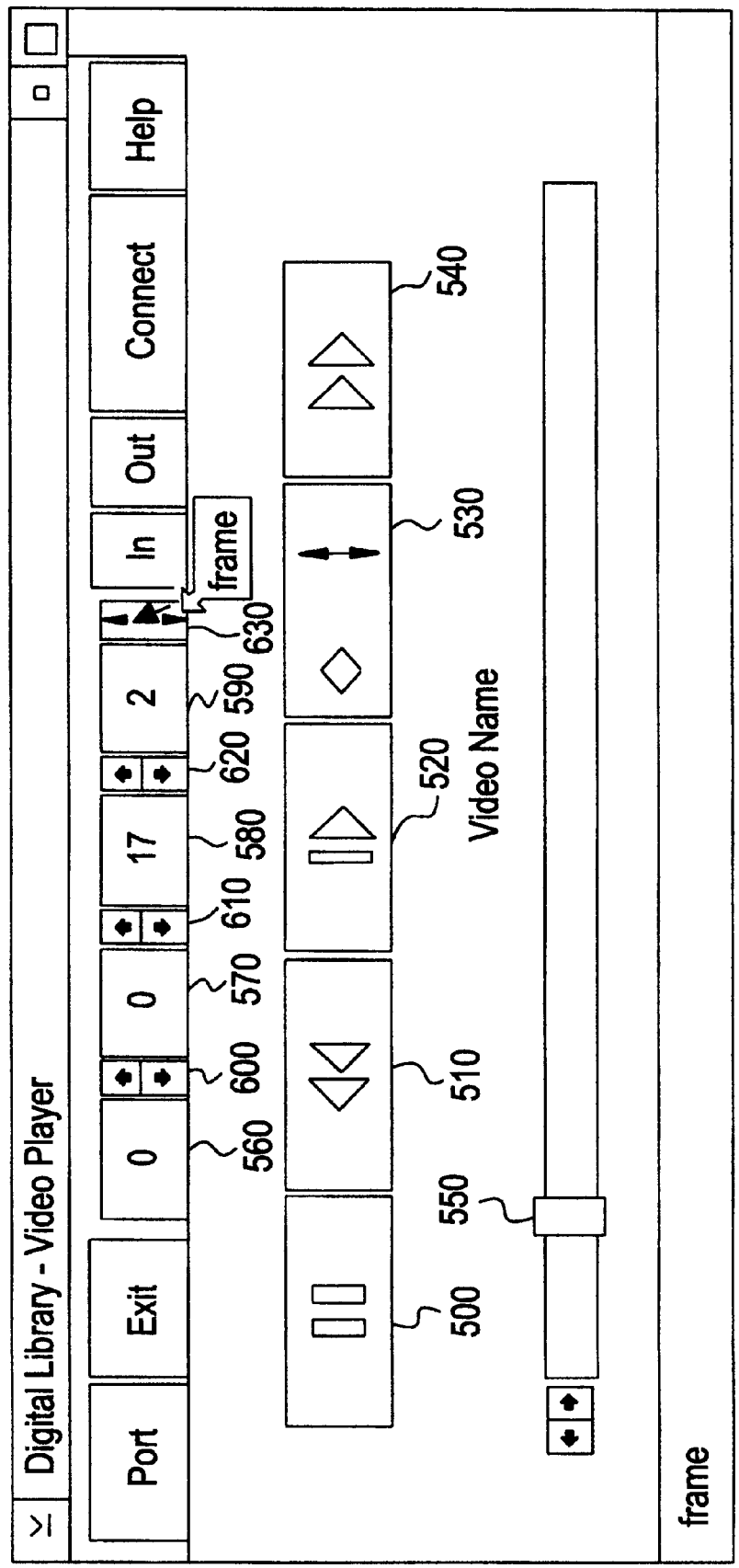
FIG. 5 shows an aspect of a graphical user interface associated with a video player component included in a video client of the present invention.

FIG. 5 shows an aspect of the graphical user interface associated with the video player. The graphical user interface includes a number of control buttons and a slide bar for entering commands.

Control buttons 500–540 correspond to player functions which are usually associated with conventional VCR's. Specifically, control button 500 corresponds to a pause command by which the segment of digital video currently being played is paused. Control button 510 corresponds to a rewind command by which the segment of digital video currently being played is rewound towards the beginning of the segment. Control button 520 corresponds to a play command by which the segment of digital video is played at normal speed. Control button 530 corresponds to a slow forward command by which the segment of digital video data is played at half its normal speed. Control button 540 corresponds to a fast forward command by which the segment of digital video data is played at three times the normal speed. The video player's graphical user interface may also include a control button (not shown) which corresponds to a stop command by which the segment of digital video data halted and removed from the video display.

Also included within the video player's graphical user interface is a slide bar 550. The slide bar allows direct access to any frame position within the segment of digital video data which is proportional to the entire duration of the video. However, the slide bar 550 only provides for relatively large jumps from one frame of digital video data to another, the jumps being taken in both the forward and backward direction.

An important aspect of the video player's graphical user interface is the ability to display indexing information corresponding to SMPTE time codes. To accomplish the display of indexing information, four time code display windows 560–590 which depict the hour, minute, second, and frame, respectively, associated with a particular SMPTE time code.

When the user actuates the slide bar 550 via a mouse or some other entry device which is included on the computer in which the video client is provided, the user sees the corresponding change in the display of indexing information 560–590.

In order to accomplish smaller jumps within the segment of digital video data, four SMPTE time code buttons 600–630 are provided on the graphical user interface. A first SMPTE time code buttons 600 allows for the user to jump within the segment of digital video data in hour increments. A second SMPTE time code button 610 allows the user to jump within the segment of digital video data in minute increments. A third SMPTE time code button 620 allows the user to jump within the segment of digital video data in second increments. Finally, a fourth SMPTE time code button 630 allows the user to jump within the segment of digital video data in discrete frame increments.

Once a SMPTE time code entry has been made via the SMPTE time code buttons 600–630, the video client will request that the video server start the play-back of that portion of the segment of digital video data starting from the frame associated with the SMPTE time code entry on the video display.

Additional functions are also supported through the video player's graphical user interface. By selecting the PORT control button, for instance, the user can select a specific port to connect to and subsequently play the selected segment of digital video data on. The default port setting may be the video display, although other devices may be connected to receive the segment of digital video data. The CONNECT control button allows the user to make such a connection. The IN and OUT control buttons provide a means for sending the current SMPTE time code entry as either a start or end time to create a logging entry. The OUT control button invokes a logging entry creation menu by which the user can enter annotation notes. The annotation notes can be saved as the note-part of the video item. Finally, EXIT and HELP control buttons are provided in order to exit the video player's graphical user interface or access a menu of features which are designed the aid the user in utilizing the video player, respectively.

Although certain preferred embodiments of the present invention have been described, the spirit and scope of the invention is by no means restricted to what is described above. For example, more than two indexing schemes can be accommodated without departing from the scope of the present invention.

What is claimed is:

1. A method for relating indexing information associated with at least two indexing schemes to facilitate the play-back of user-specified digital video data, the method comprising the steps of:

scanning a stream of digital video data for indexing information related to at least two indexing schemes prior to being stored in a video server; and generating a mapping table in order to convert indexing information associated with one of the at least two indexing schemes to corresponding indexing information associated with another one of said at least two indexing schemes, said indexing information identifying discrete portions of said stream of digital video data so that said portions can be accessed at a later time.

2. The method defined in claim 1, further comprising the step of storing the mapping table.

3. The method defined in claim 2, wherein the mapping table is stored in a database.

4. The method defined in claim 2, further comprising the steps of:

selecting a segment of the stream of digital video data to be displayed on a video display;

retrieving the mapping table;

monitoring control means included within a graphical user interface of a video client to determine whether indexing information associated with an original indexing scheme of the at least two indexing schemes has been entered using the control means; and converting any indexing information entered using the control means to indexing information associated with another indexing scheme of the at least two indexing schemes which is compatible with a video server that sends digital video data to the video display for display thereon.

5. The method defined in claim 3, further comprising the steps of:

selecting a segment of the stream of digital video data to be displayed on a video display;

retrieving the mapping table from said database;

monitoring control means included within a graphical user interface of a video client to determine whether indexing information associated with an original indexing scheme of the at least two indexing schemes has been entered using the control means; and converting any indexing information entered using the control means to indexing information associated with another indexing scheme of the at least two indexing schemes which is compatible with a video server that sends digital video data to the video display for display thereon.

6. The method defined in claim 4, further comprising the steps of:

transferring the converted indexing information entered using the control means to the video server; and displaying a portion of the segment of the stream of digital video data corresponding to the converted indexing information, said video server sending the portion to the video display for display thereon.

7. The method defined in claim 5, further comprising the steps of:

transferring the converted indexing information entered using the control means to the video server; and displaying a portion of the segment of the stream of digital video data corresponding to the converted indexing information, the video server sending said portion to the video display for display thereon.

8. The method defined in claim 4, wherein said indexing information entered using the control means includes SMPTE time codes.

9. The method defined in claim 5, wherein said indexing information entered using the control means includes SMPTE time codes.

10. The method defined in claim 8, wherein said converted indexing information includes MPEG byte-offsets.

11. The method defined in claim 9, wherein said converted indexing information includes MPEG byte-offsets.

12. The method defined in claim 4, further comprising the step of displaying said indexing information on the graphical user interface.

13. The method defined in claim 5, further comprising the step of displaying said indexing information on the graphical user interfaces.

14. The method defined in claim 6, further comprising the steps of:

receiving a call back message from the video server including indexing information associated with the indexing scheme which is compatible with the video server, the indexing information corresponding to a portion of the segment of the stream of digital video data which was actually displayed on the video display;

converting the indexing information included in the call back message into indexing information associated with the original indexing scheme; and displaying on the graphical interface of the video client the indexing information associated with the original indexing scheme which corresponds to the portion of the segment of the stream of digital video data which was actually displayed on the video display.

15. The method defined in claim 7, further comprising the steps of:

receiving a call back message from the video server including indexing information associated with the indexing scheme which is compatible with the video server, the indexing information corresponding to a portion of the segment of the stream of digital video data which was actually displayed on the video display;

converting the indexing information included in the call back message into indexing information associated with the original indexing scheme; and displaying on the graphical interface of the video client the indexing information associated with the original indexing scheme which corresponds to the portion of the segment of the stream of digital video data which was actually displayed on the video display.

16. The method defined in claim 8, wherein the stream of digital video data includes a plurality of frames, each of the plurality of frames being associated with one of the SMPTE time codes.

17. The method defined in claim 9, wherein th e stream of digital video data includes a plurality of frames, each of the plurality of frames being associated with one of the SMPTE time codes.

18. The method defined in claim 16, wherein the plurality of frames are I-frames.

19. The method defined in claim 16, wherein the plurality of frames are I-frames.

20. A video client which relates indexing information associated with at least two indexing schemes to facilitate the play-back of user-specified digital video data on a video display, said video player comprising:

a loader which scans said digital video data for indexing information and loads said digital video data into a video server, said loader comprising a mapper which generates a mapping table relating indexing information associated with the at least two indexing schemes; and a video player that controls the play-back of said digital video data using said mapping table which is retrieved by said video player when said digital video data is to be displayed, said video server sending said digital video data to the video display in response to the control exercised by said video player.

21. The video client defined in claim 20, wherein said loader stores said mapping table.

22. The video client defined in claim 20, wherein said loader stores said mapping table in a database.

23. The video client defined in claim 21, further comprising a graphical user interface displayed on said video display through which a user may interact with said loader and said video player, said user interacting with said loader in order to generate said mapping table and with said video player in order to select a segment of said digital video data for play-back on said video display.

24. The video player defined in claim 22, further comprising a graphical user interface displayed on said video display through which a user may interact with said loader and said video player, said user interacting with said loader in order to generate said mapping table and with said video player in order to select a segment of said digital video data for play-back on said video display.

25. The video client defined in claim 23, wherein said graphical user interface further comprises control means for entering user commands, said video player monitoring said control means to determine whether a user has entered any commands using said control means, said video player retrieving said mapping table when a user has selected said segment of said digital video data using said control means and converting any indexing information associated with an original indexing scheme of the at least two indexing schemes that is entered using said control means to indexing information associated with another indexing scheme of the at least two indexing schemes that is compatible with said video server which sends said segment of digital video data to said video display.

26. The video client defined by claim 24, wherein said graphical user interface further comprises control means for entering user commands, said video player monitoring said control means to determine whether a user has entered any commands using said control means, said video player retrieving said mapping table when a user has selected said segment of said digital video data using said control means and converting any indexing information associated with an original indexing scheme of the at least two indexing schemes that is entered using said control means to indexing information associated with another indexing scheme of the at least two indexing schemes that is compatible with said video server which sends said segment of digital video data to said video display.

27. The video client defined in claim 25, further comprising an application program interface through which said loader and video player communicates with said video server, said application program interface placing data requests generated by said loader and video player in a form which is recognized by said video server, said video player transferring said indexing information converted by said video player to said video server through said application program interface.

28. The video client defined in claim 26, further comprising an application program interface through which said loader and video player communicates with said video server, said application program interface placing data requests generated by said loader and video player in a form which is recognized by said video server, said video player transferring said indexing information converted by said video player to said video server through said application program interface.

29. The video client recited in claim 27, wherein said indexing information entered using said control means includes SMPTE time codes.

30. The video client recited in claim 28, wherein said indexing information entered using said control means includes SMPTE time codes.

31. The video client recited in claim 29, wherein said converted indexing information includes MPEG byte-offsets.

32. The video client recited in claim 28, wherein said converted indexing information includes MPEG byte-offsets.

33. The video client recited in claim 29, wherein said control means comprises control buttons which are actuated by said user.

34. The video client recited in claim 30, wherein said control means comprises control buttons which are actuated by said user.

35. The video client recited in claim 33, wherein said video player further comprises a command line interpreter for entering text-based commands.

36. The video client recited in claim 34, wherein said video player further comprises a command line interpreter for entering text-based commands.

37. The video client recited in claim 33, wherein said control buttons comprise:
   a first control button which allows the user to jump within said segment of digital video data in hour increments;
   a second control button which allows the user to jump within said segment of digital video data in minute increments;
   a third control button which allows the user to jump within said segment of digital video data in second increments; and
   a fourth control button which allows the user to jump within said segment of digital video data in frame increments.

38. The video client recited in claim 34, wherein said control buttons comprise:
   a first control button which allows the user to jump within said segment of digital video data in hour increments;
   a second control button which allows the user to jump within said segment of digital video data in minute increments;
   a third control button which allows the user to jump within said segment of digital video data in second increments; and
   a fourth control button which allows the user to jump within said segment of digital video data in frame increments.

39. The video client defined in claim 38, wherein said graphical user interface further comprises a plurality of time code display windows which depict a particular SMPTE time code corresponding to said portion of said segment of digital video data being displayed on said graphical user interface.

40. The video client defined in claim 38, wherein said graphical user interface further comprises a plurality of time code display windows which depict a particular SMPTE time code corresponding to said portion of said segment of digital video data being displayed on said graphical user interface.

41. The video client defined in claim 39, wherein said plurality of time code display windows comprises:
   a first time code display window which depicts the hour associated with a particular SMPTE time code corresponding to said portion of said segment of digital video being displayed;
   a second time code display window which depicts the minute associated with a particular SMPTE time code corresponding to said portion of said segment of digital video being displayed;
   a third time code display window which depicts the second associated with a particular SMPTE time code corresponding to said portion of said segment of digital video being displayed; and
   a fourth time code display window which depicts the frame associated with a particular SMPTE time code corresponding to a portion of said segment of digital video data being displayed.

42. The video client defined in claim 40, wherein said plurality of time code display windows comprises:
   a first time code display window which depicts the hour associated with a particular SMPTE time code corresponding to said portion of said segment of digital video being displayed;
   a second time code display window which depicts the minute associated with a particular SMPTE time code corresponding to said portion of said segment of digital video being displayed;

a third time code display window which depicts the second associated with a particular SMPTE time code corresponding to said portion of said segment of digital video being displayed; and a fourth time code display window which depicts the frame associated with a particular SMPTE time code corresponding to said portion of said segment of digital video data being displayed.

43. The video client defined in claim 41, wherein said control means further comprises a slide bar which provides access to any frame position within the segment of digital video data which is proportional to an entire duration of said segment of said digital video data upon actuation of said slide bar by said user.

44. The video client defined in claim 42, wherein said control means further comprises a slide bar which provides access to any frame position within the segment of digital video data which is proportional to an entire duration of said segment of said digital video data upon actuation of said slide bar by said user.

* * * * *